United States Patent [19]

Rees

[11] 4,349,248
[45] Sep. 14, 1982

[54] GRADIENT INDEX LENS ARRAY WITH IMPROVED EXPOSURE UNIFORMITY

[75] Inventor: James D. Rees, Pittsford, N.Y.

[73] Assignee: Xerox Corporation, Stamford, Conn.

[21] Appl. No.: 142,921

[22] Filed: Apr. 23, 1980

[51] Int. Cl.³ .................. G02B 3/00; G03B 27/10; G03B 27/72
[52] U.S. Cl. .......................... 350/413; 355/1
[58] Field of Search ............... 350/413, 96.31; 355/1

[56] References Cited

U.S. PATENT DOCUMENTS 4,068,936  1/1978  Kushima et al. .................. 355/1

FOREIGN PATENT DOCUMENTS 54-126528  10/1979  Japan ......................... 355/1

OTHER PUBLICATIONS

Rees et al., "Some Radiometric Properties of Gradient-Index Fiber Lenses", App. Optics, 4-1-80, pp. 1065-1069.

*Primary Examiner*—William H. Punter

[57] ABSTRACT

A gradient index lens is positioned between an object and image plane to transmit an image of an object onto the image plane. The lens is oriented at an angle with respect to the object and image planes such that exposure modulation of the image plane in the process direction is minimized.

5 Claims, 6 Drawing Figures

GRADIENT INDEX LENS ARRAY WITH IMPROVED EXPOSURE UNIFORMITY

BACKGROUND

The present invention relates to gradient index optical fibers and, more particularly, to a gradient index lens array which transmits an image of an object at an object plane onto an image plane with minimum exposure modulation.

Image transmitters comprising bundled gradient index optical fibers are known in the art. U.S. Pat. No. 3,658,407 describes a light conducting fiber made of glass or synthetic resin which has a refractive index distribution in a cross section thereof that varies parabolically outward from a center portion thereof. Each fiber acts as a focusing lens to transmit part of an image of an object placed near one end thereof and an assembly of fibers, in a one or two-row array, transmit and focus a complete image of the object. The fiber lenses are produced under the tradename "SELFOC", the mark is registered in Japan and owned by Nippon Sheet Glass Co., Ltd.

These gradient index lens arrays have found use in a number of technologies; e.g. in construction of printed type optical circuits as disclosed in U.S. Pat. No. 3,922,062 and as a replacement for conventional optical systems in copiers as disclosed in U.S. Pat. Nos. 3,947,106 and 3,977,777.

Imaging systems which utilize gradient index lens arrays are inherently subject to a problem of non-uniformity of exposure of an image at an imaging plane. In the typical staggered two-row prior art device, overlapping subimages of individual fibers result in exposure non-uniformity in the direction perpendicular to the process direction. This non-uniformity can be minimized by greatly increasing the field overlaps but there is a tradeoff in reduced optical tolerances associated with this technique. Another approach to minimize this type of exposure non-uniformity was disclosed in an article by James D. Rees and William L. Lama "Some Radiometric Properties of Gradient Index Fiber Lenses", published on Apr. 1, 1980 in Applied Optics, Vol. 19, No. 7. Essentially, the article disclosed a method of minimizing spatial non-uniformities by optimum selection of the fiber parameters, length, gradient index constant and packing factor. This technique, however, may not lend itself to applications where, for example, system requirements call for a fiber length different from the optimum length.

SUMMARY

It is, therefore, the main object of the present invention to utilize a gradient index lens array in such a manner that spatial exposure non-uniformities are reduced, irrespective of fiber parameters. According to the invention, a gradient index lens array, located between an object and image plane, is positioned in a vertical plane which is at an angle $\phi$ greater than zero with respect to a plane perpendicular to the direction of relative motion of a line on said object plane.

DRAWINGS

DESCRIPTION

Figure 1:
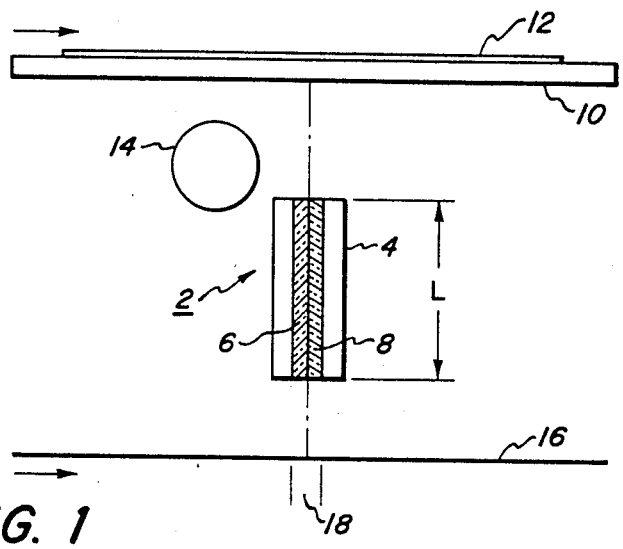
FIG. 1 is an end schematic view of a prior art gradient index lens array in an imaging system.

Referring now to FIG. 1, there is shown, in side view, an optical system 2 which includes a gradient index lens array 4 comprising two staggered rows 6,8 of gradient index fibers of length L arranged in a bundled configuration as is known in the prior art. In one embodiment, transparent object plane 10 is adapted for movement past lens array 4 in the indicated direction. Plane 10 has an object 12, which may be a document, supported thereon. Lamp 14 provides an intense narrow band of illumination through an aperture (not shown) across a narrow width of the object plane 10.

Figure 2:
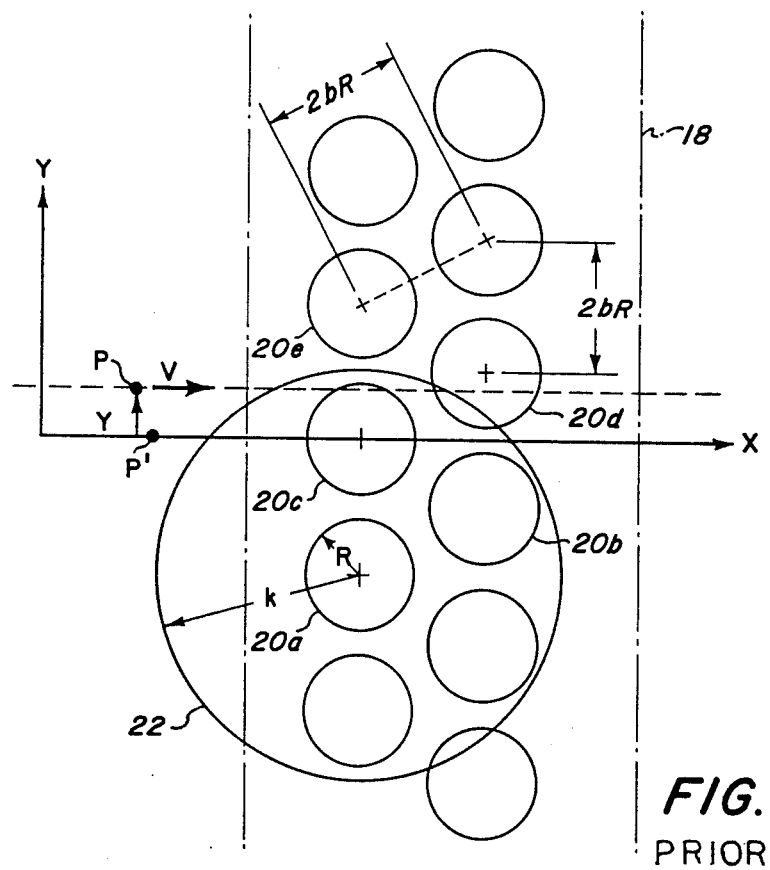
FIG. 2 is a schematic top end view of a portion of the lens array of FIG. 1, showing exposure conditions at the imaging plane.

In operation, plane 10 is moved across the illuminated area at a speed synchronous with that of imaging plane 16 which, preferably has a photosensitive surface. A narrow strip of light is reflected from object 12 and focused by lens array 4 onto exposure strip 18 of plane 16. FIG. 2 is a top view of an enlarged portion of lens array 4 looking downward through the lens and viewing the exposure along the corresponding portion of strip 18. A point P on imaging plane 16 moves at a speed v through exposure zone 18. The total exposure (E) that point P receives as it passes through zone 18 is a summation of the exposure values of each contributing fiber. Each fiber 20 has an irradiance (optical power per unit H) in the image plane profile 22 which is derived according to the principles disclosed in the aforementioned Rees-Lama reference, whose contents are herein incorporated by reference.

The total exposure (E) point P receives is derived by using the summing equations disclosed in the Rees-Lama reference. Of importance for the purposes herein is that the total exposure received by any point on the imaging plane passing through zone 18 is a function of its position on the y plane. For example, point P' adjacent point P will receive a different distribution because of the different overlapping orientation of the contributing fiber. This exposure non-uniformity between different points on the imaging plane is inherent because of the fiber spacing of a gradient index lens and results in an image being formed on the image plane which varies in uniformity of exposure.

A useful equation derived by Rees-Lama in the previously referenced article to describe circular irradiance profile 22 is as follows:

$$k = aR = -R \sec\left(\sqrt{A}\, L/2\right) \tag{1}$$

where k (shown in FIG. 2 of the present application) is the radius of the irradiance profile, (a) is an "overlap parameter", R is the radius of the fiber, A is a gradient index constant and L is the fiber length in the Z direction (shown in FIG. 1). The exposure modulation at the image plane is known to decrease with increasing values of overlap parameter a. Equation (1) can be rewritten in terms of (a)

$$a = -\sec\left(\sqrt{A}\ L/2\right) \tag{2}$$

Figure 3:
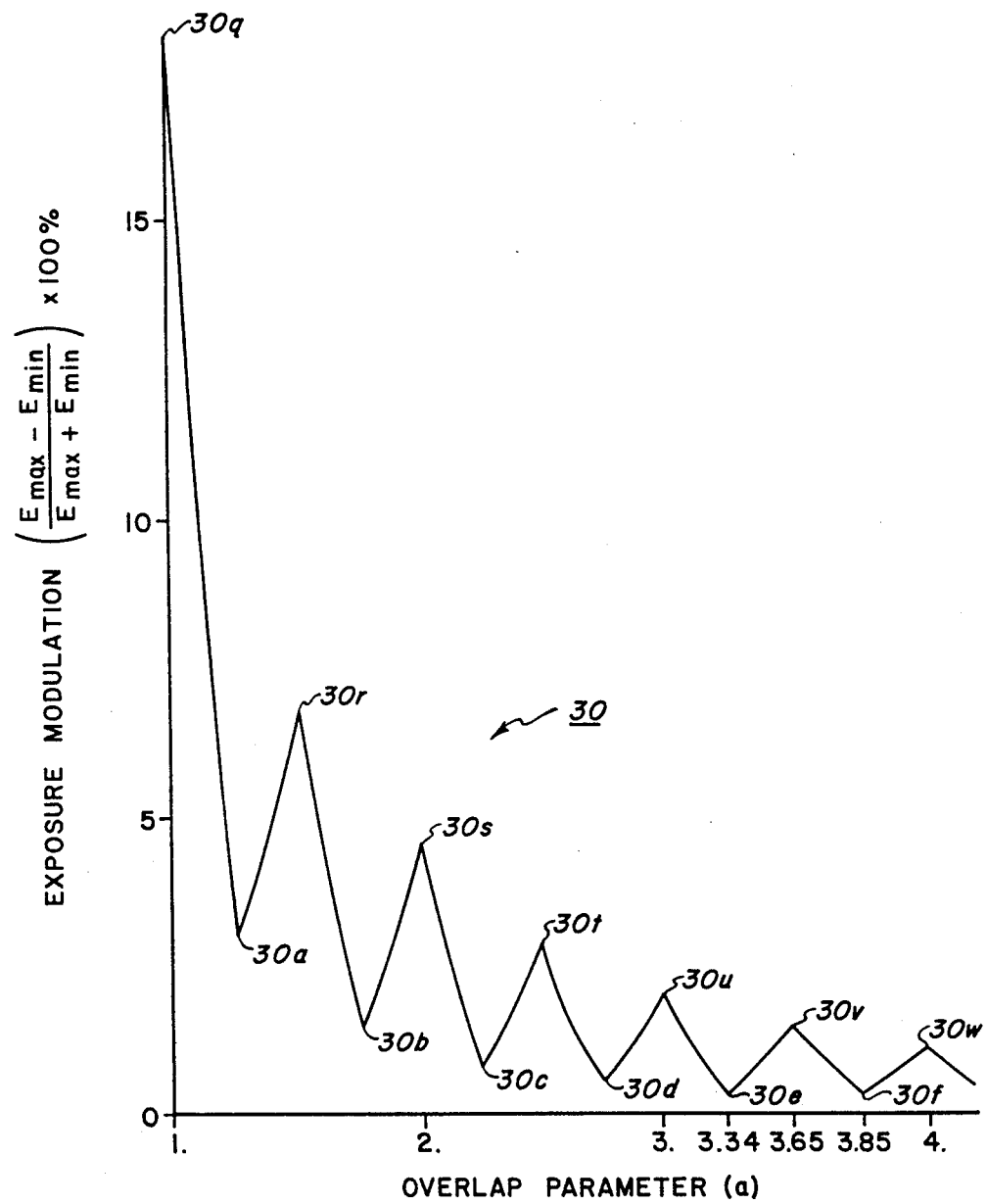
FIG. 3 is a graph plotting exposure modulation at the image plane against values of overlap parameter (a).

If (a) is made to change by substituting appropriate values of A and L, values of (a) plotted against the exposure modulation at each value yields plot 30 shown in FIG. 3 for b=1.0. As is evident, the exposure modulation has various maximum (30q–30w) and minimum (30a–30f) values and the modulation can be minimized by selecting values of (a) at one of points 30a–30f. As shown in the Rees-Lama article, these optimum values can be expressed as $$(a)\ \text{modulation minima} = \frac{b}{2}\ \sqrt{S(S+1)} \tag{3}$$

where b (shown in FIG. 2) is a spacing factor equal to the separation between fiber centers divided by the fiber diameter 2R and S=2, 3, 4, . . . .

Figure 4:
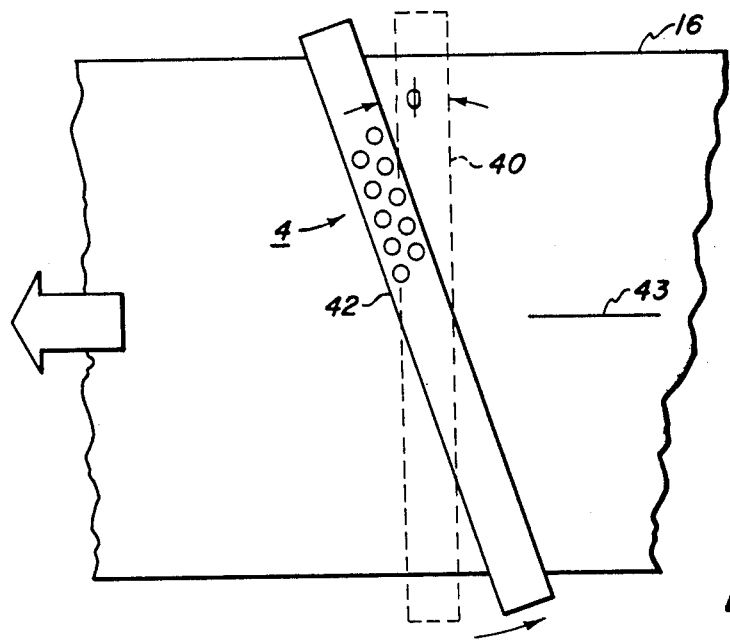
FIG. 4 is a top view of the gradient index lens array inclined at an angle to the travel of a line on the image plane.

According to the principles of the present invention the value of packing factor b can be effectively changed, thereby changing the values of (a) for modulation minima without changing any of the fiber parameters (a) (L, R, A) or the actual fiber spacing. This is accomplished as shown in FIG. 4. FIG. 4 is a top view of the lens of FIG. 1 showing the lens in an original position 40 and lying vertically oriented in a first plane normal to the object and image plane and in a new position 42 still normal with object and image plane but now lying in a second plane separated by an angle $\phi$ with respect to the first normal plane.

Stated alternatively, in original position 40, the lens array 4 lies in a plane which is perpendicular to a line 43 lying on plane 16 and moving through the exposure zone below the lens. In position 42, the lens lies in a plane which is transverse to the movement of line 43 (which can be considered as a locus of point P of FIG. 2) by some angle $\phi$ which is greater than zero.

Figure 5:
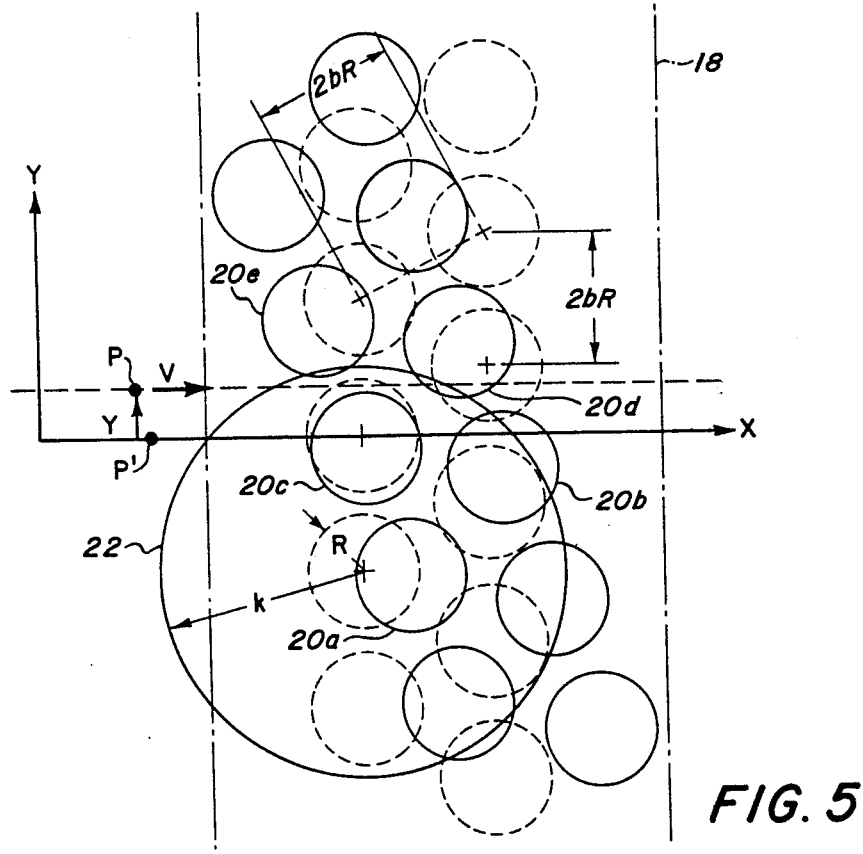
FIG. 5 is a schematic top view (enlarged) of a portion of the lens array of FIG. 4 showing exposure conditions at the image plane.

The exposure at the image plane then acquires a different exposure profile as shown in FIG. 5. In FIG. 5, the change in orientation has shifted the incidence profiles in a counter-clockwise direction, altering the exposure that points P and P′ will receive. An optimum value of $\phi$ can now be selected which will moderate the effects of the previously described modulation. Equation (4) can then be rewritten:

$$a\ (\text{modulation minima}) = \frac{b(\cos\phi)}{2}\ \sqrt{S(S+1)}\ ;\ S = 2, 3, 4, \ldots \tag{4}$$

It is noted that this equation resembles equation (3) except for the addition of the cos $\phi$ term. In effect, equation (3) and hence the values of (a) plotted in FIG. 3, were a special application of equation (4) wherein cos $\phi$=1.

It is desired that the value of (a) from Equation (2) corresponds to an exposure modulation minimum. To accomplish this, Equations (2) and (4) can be combined to provide the following equation:

$$-\sec\left(\sqrt{A}\ L/2\right) = \frac{b\cos\phi}{2}\ \sqrt{S(S+1)} \tag{5}$$

Equation (5) can be fulfilled for any value of (a)=−sec($\sqrt{A}$L/2) by selecting a value of $\phi$ to satisfy the equation; i.e.:

$$\cos\phi = 2\frac{\left[-\sec\sqrt{A}\ L/2\right]}{b\sqrt{S(S+1)}} \tag{6}$$

where S=2, 3, 4 . . . and where $$\sqrt{S(S+1)} \geq \frac{2\left[-\sec\left(\sqrt{A}\ L/2\right)\right]}{b} \tag{7}$$

A conventional staggered two-row gradient index lens array was used to demonstrate the applicability of the present invention. A lens array has the following individual fiber parameters; $\sqrt{A}$=0.1275 mm$^{-1}$, fiber length (L) of 28.99 mm and separation parameter (b) of 1.03. The lens is positioned to have an object-to-lens distance of 18 mm and image-to-lens distance of 18 mm for a total conjugate (in air) of 65 mm. Solving for (a) in equation (2) yields an (a) value of 3.65. From FIG. 3 (where cos $\phi$=1), this value of (a) clearly does not correspond to an exposure modulation minimum, as desired. The value of (a) of 3.65 can be made to correspond to an exposure minimum by introducing a tilt angle $\phi$. Substituting into equation (6) with S=7; we have in this case, $$\cos\phi = \frac{2[3.65]}{1.03\sqrt{7(7+1)}}$$

or $\phi$=19°, the minimum value of $\phi$ that satisfies equation (6). The lens was then tilted 19° from the initial vertical orientation, either clockwise or counter clockwise, to achieve the desired minimum modulation. FIGS. 4 and 5 demonstrate a lens array tilted 19° in the counterwise direction. It may be noted here that total conjugate, as defined in the Rees-Lama article, is not a function of $\phi$ and so has not been affected by the angle change.

While the invention has been described in terms of a two-row staggered array, the principles set forth herein are also effective in a gradient index array consisting of a single row of fibers. In a one-row array, exposure modulation is greater than that encountered in a two-row array; hence the present invention is even more effective when used in a single row array.

Figure 6:
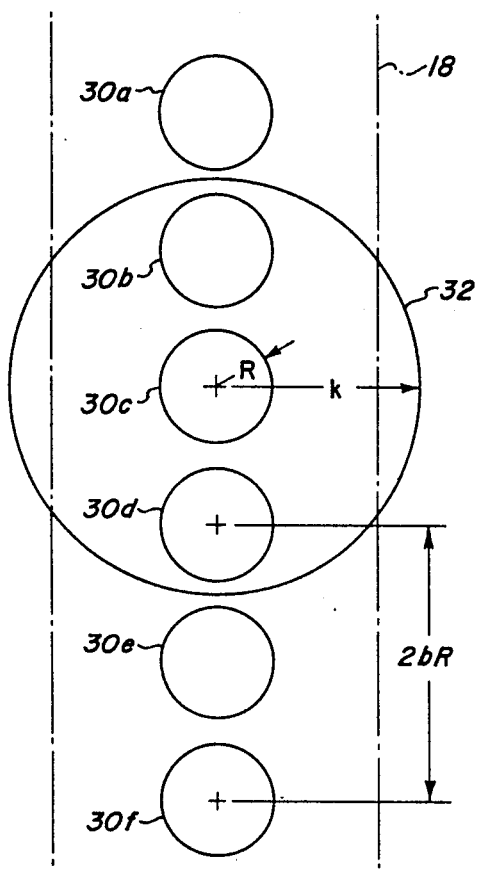
FIG. 6 is a schematic top view (enlarged) of a portion of a single row lens array showing exposure conditions at the imaging plane.

An end view of a portion of a single row lens array with exposure conditions at the imaging plane is shown in FIG. 6. As with the previous two-row embodiment, each fiber 30 has an irradiance profile, one of which, 32, is shown. The main distinction is seen in the spacing 2bR being between the center of alternate fibers. Otherwise, the conditions for determining lens tilt angle $\phi$ for minimum modulation is obtained as for the above two row example.

While the invention has been described in a system wherein the lens array and illumination sources are fixed and the object and image planes are moved, the invention may also be practiced in a system wherein the lens array and illumination source move to scan a stationary object.

I claim:

1. In an optical imaging system, a plurality of gradient index fibers arranged in a lens array, said lens array positioned between an object and image plane,
   means for illuminating said object plane,
   means for providing relative motion between said lens array and said object and image planes whereby light reflected from at least a portion of an object is transmitted by said lens array so as to imagewise expose a portion of said imaging plane,
   said lens array lying in a vertical plane which is transverse, by an angle $\phi$ greater than zero, to a plane perpendicular to the direction of relative motion of a point on said image plane, passing through said exposure zone.

2. The imaging system of claim 1 wherein said lens array comprises at least a single row of fibers bound together in side-by-side relationship with each other.

3. The imaging system of claims 1 or 2 wherein the exposure modulation at the portion of the imaging plane being exposed is a periodic function of the fiber overlap parameter (a) defined by the term $(a) = -\sec(\sqrt{A}L/2)$ and wherein the value of $\phi$ is selected so that the value of (a) corresponds to one of the minimum exposure modulations.

4. The imaging system of claim 3 wherein the value of $\phi$ is give by the expression:

$$\phi = \cos^{-1}\left[\frac{2\left(-\sec\left(\sqrt{A}\,L/2\right)\right)}{b\sqrt{S(S+1)}}\right]$$

wherein b is the packing factor of the lens, S=2, 3, 4 . . . and $$\sqrt{S(S+1)} \geq \left[\frac{2\left[-\sec\left(\sqrt{A}\,L/2\right)\right]}{b}\right]$$

5. The imaging system of claim 1 or 3 wherein said lens array comprises two staggered rows of fibers, each row bound together in side-by-side relationship.

* * * * *

UNITED STATES PATENT AND TRADEMARK OFFICE
CERTIFICATE OF CORRECTION

PATENT NO. : 4,349,248

DATED : September 14, 1982

INVENTOR(S) : James D. Rees

It is certified that error appears in the above-identified patent and that said Letters Patent are hereby corrected as shown below:

Col. 4, Equation (7), " $\geqq$ " should read -- $\geq$ --.

Col. 6, line 16, change "packing" to --spacing--.

Col. 6, line 22, " $\geqq$ " should read -- $\geq$ --.

Signed and Sealed this

Eleventh Day of January 1983

[SEAL]

Attest:

GERALD J. MOSSINGHOFF

Attesting Officer     Commissioner of Patents and Trademarks